US008472681B2

(12) United States Patent
Hamza

(10) Patent No.: US 8,472,681 B2
(45) Date of Patent: Jun. 25, 2013

(54) IRIS AND OCULAR RECOGNITION SYSTEM USING TRACE TRANSFORMS

(75) Inventor: Rida Hamza, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 454 days.

(21) Appl. No.: 12/814,232

(22) Filed: Jun. 11, 2010

(65) Prior Publication Data
US 2010/0316263 A1 Dec. 16, 2010

Related U.S. Application Data

(60) Provisional application No. 61/268,676, filed on Jun. 15, 2009.

(51) Int. Cl.
G06K 9/00 (2006.01)
G06K 9/40 (2006.01)
G06K 9/44 (2006.01)

(52) U.S. Cl.
USPC .............................. 382/117; 382/255; 382/266

(58) Field of Classification Search
None
See application file for complete search history.

(56) References Cited

U.S. PATENT DOCUMENTS

| 4,641,349 A | 2/1987 | Flom et al. |
| 4,836,670 A | 6/1989 | Hutchinson |
| 5,231,674 A | 7/1993 | Cleveland et al. |
| 5,291,560 A | 3/1994 | Daugman |
| 5,293,427 A | 3/1994 | Ueno et al. |
| 5,359,382 A | 10/1994 | Uenaka |
| 5,404,013 A | 4/1995 | Tajima |
| 5,543,887 A | 8/1996 | Akashi |
| 5,551,027 A | 8/1996 | Choy et al. |
| 5,572,596 A | 11/1996 | Wildes et al. |
| 5,608,472 A | 3/1997 | Szirth et al. |
| 5,664,239 A | 9/1997 | Nakata |

(Continued)

FOREIGN PATENT DOCUMENTS

| EP | 0484076 | 5/1992 |
| EP | 0593386 | 4/1994 |

(Continued)

OTHER PUBLICATIONS

Chun et al, "Iris Recognition for Palm-Top Application," 2004, ICBA 2004, LNCS 3072, pp. 426-433.*

(Continued)

Primary Examiner — Andrew W Johns
Assistant Examiner — David F Dunphy
(74) Attorney, Agent, or Firm — Seager Tufte & Wickhem LLC.

(57) ABSTRACT

An iris and ocular recognition system using trace transforms. The system may acquire an eye image and provide it to an image quality metrics determination module for a quality evaluation to indicate whether the image goes to an iris recognition module and/or a trace transform module. The trace transform may also be used as a pre-filtering mechanism to determine a small database from bigger datasets. If the quality evaluation reaches a predefined quality measure, the image may be passed immediately to the iris recognition module. If not, the image may go to the trace transform module. If the quality evaluation is too poor for the latter, the image may be rejected subject to rehabilitation or reacquisition. A processed image from the iris recognition module may result in an only best match. A processed image from the trace transform module may be lined up instead with the most probable matches.

20 Claims, 5 Drawing Sheets

U.S. PATENT DOCUMENTS

| | | |
|---|---|---|
| 5,671,447 A | 9/1997 | Tokunaga |
| 5,687,031 A | 11/1997 | Ishihara |
| 5,717,512 A | 2/1998 | Chmielewski, Jr. et al. |
| 5,719,951 A * | 2/1998 | Shackleton et al. .......... 382/118 |
| 5,751,836 A | 5/1998 | Wildes et al. |
| 5,859,686 A | 1/1999 | Aboutalib et al. |
| 5,860,032 A | 1/1999 | Iwane |
| 5,896,174 A | 4/1999 | Nakata |
| 5,901,238 A | 5/1999 | Matsushita |
| 5,909,269 A | 6/1999 | Isogai et al. |
| 5,953,440 A | 9/1999 | Zhang et al. |
| 5,956,122 A | 9/1999 | Doster |
| 5,978,494 A | 11/1999 | Zhang |
| 5,991,429 A | 11/1999 | Coffin et al. |
| 6,005,704 A | 12/1999 | Chmielewski, Jr. et al. |
| 6,007,202 A | 12/1999 | Apple et al. |
| 6,012,376 A | 1/2000 | Hanke et al. |
| 6,021,210 A | 2/2000 | Camus et al. |
| 6,028,949 A | 2/2000 | McKendall |
| 6,055,322 A | 4/2000 | Salganicoff et al. |
| 6,064,752 A | 5/2000 | Rozmus et al. |
| 6,069,967 A | 5/2000 | Rozmus et al. |
| 6,081,607 A | 6/2000 | Mori et al. |
| 6,088,470 A | 7/2000 | Camus et al. |
| 6,091,899 A | 7/2000 | Konishi et al. |
| 6,101,477 A | 8/2000 | Hohle et al. |
| 6,104,431 A | 8/2000 | Inoue et al. |
| 6,108,636 A | 8/2000 | Yap et al. |
| 6,119,096 A | 9/2000 | Mann et al. |
| 6,120,461 A | 9/2000 | Smyth |
| 6,134,339 A | 10/2000 | Luo |
| 6,144,754 A | 11/2000 | Okano et al. |
| 6,246,751 B1 | 6/2001 | Bergl et al. |
| 6,247,813 B1 | 6/2001 | Kim et al. |
| 6,252,977 B1 | 6/2001 | Salganicoff et al. |
| 6,259,478 B1 | 7/2001 | Hori |
| 6,282,475 B1 | 8/2001 | Washington |
| 6,285,505 B1 | 9/2001 | Melville et al. |
| 6,285,780 B1 | 9/2001 | Yamakita et al. |
| 6,289,113 B1 | 9/2001 | McHugh et al. |
| 6,299,306 B1 | 10/2001 | Braithwaite et al. |
| 6,308,015 B1 | 10/2001 | Matsumoto |
| 6,309,069 B1 | 10/2001 | Seal et al. |
| 6,320,610 B1 | 11/2001 | Van Sant et al. |
| 6,320,612 B1 | 11/2001 | Young |
| 6,320,973 B2 | 11/2001 | Suzuki et al. |
| 6,323,761 B1 | 11/2001 | Son |
| 6,325,765 B1 | 12/2001 | Hay et al. |
| 6,330,674 B1 | 12/2001 | Angelo et al. |
| 6,332,193 B1 | 12/2001 | Glass et al. |
| 6,344,683 B1 | 2/2002 | Kim |
| 6,370,260 B1 | 4/2002 | Pavlidis et al. |
| 6,377,699 B1 | 4/2002 | Musgrave et al. |
| 6,393,136 B1 | 5/2002 | Amir et al. |
| 6,400,835 B1 | 6/2002 | Lemelson et al. |
| 6,424,727 B1 | 7/2002 | Musgrave et al. |
| 6,424,845 B1 | 7/2002 | Emmoft et al. |
| 6,433,818 B1 | 8/2002 | Steinberg et al. |
| 6,438,752 B1 | 8/2002 | McClard |
| 6,441,482 B1 | 8/2002 | Foster |
| 6,446,045 B1 | 9/2002 | Stone et al. |
| 6,483,930 B1 | 11/2002 | Musgrave et al. |
| 6,484,936 B1 | 11/2002 | Nicoll et al. |
| 6,490,443 B1 | 12/2002 | Freeny, Jr. |
| 6,493,669 B1 | 12/2002 | Curry et al. |
| 6,494,363 B1 | 12/2002 | Roger et al. |
| 6,503,163 B1 | 1/2003 | Van Sant et al. |
| 6,505,193 B1 | 1/2003 | Musgrave et al. |
| 6,506,078 B1 | 1/2003 | Mori et al. |
| 6,508,397 B1 | 1/2003 | Do |
| 6,516,078 B1 | 2/2003 | Yang et al. |
| 6,516,087 B1 | 2/2003 | Camus |
| 6,516,416 B2 | 2/2003 | Gregg et al. |
| 6,522,772 B1 | 2/2003 | Morrison et al. |
| 6,523,165 B2 | 2/2003 | Liu et al. |
| 6,526,160 B1 | 2/2003 | Ito |
| 6,532,298 B1 | 3/2003 | Cambier et al. |
| 6,540,392 B1 | 4/2003 | Braithwaite |
| 6,542,624 B1 | 4/2003 | Oda |
| 6,546,121 B1 | 4/2003 | Oda |
| 6,553,494 B1 | 4/2003 | Glass |
| 6,580,356 B1 | 6/2003 | Alt et al. |
| 6,591,001 B1 | 7/2003 | Oda et al. |
| 6,591,064 B2 | 7/2003 | Higashiyama et al. |
| 6,594,377 B1 | 7/2003 | Kim et al. |
| 6,594,399 B1 | 7/2003 | Camus et al. |
| 6,598,971 B2 | 7/2003 | Cleveland |
| 6,600,878 B2 | 7/2003 | Pregara |
| 6,614,919 B1 | 9/2003 | Suzaki et al. |
| 6,652,099 B2 | 11/2003 | Chae et al. |
| 6,674,367 B2 | 1/2004 | Sweatte |
| 6,687,389 B2 | 2/2004 | McCartney et al. |
| 6,690,997 B2 | 2/2004 | Rivalto |
| 6,708,176 B2 | 3/2004 | Strunk et al. |
| 6,709,734 B2 | 3/2004 | Higashi et al. |
| 6,711,562 B1 | 3/2004 | Ross et al. |
| 6,714,665 B1 | 3/2004 | Hanna et al. |
| 6,718,049 B2 | 4/2004 | Pavlidis et al. |
| 6,718,050 B1 | 4/2004 | Yamamoto |
| 6,718,665 B2 | 4/2004 | Hess et al. |
| 6,732,278 B2 | 5/2004 | Baird, III et al. |
| 6,734,783 B1 | 5/2004 | Anbai |
| 6,745,520 B2 | 6/2004 | Puskaric et al. |
| 6,750,435 B2 | 6/2004 | Ford |
| 6,751,733 B1 | 6/2004 | Nakamura et al. |
| 6,753,919 B1 | 6/2004 | Daugman |
| 6,754,640 B2 | 6/2004 | Bozeman |
| 6,760,467 B1 | 7/2004 | Min et al. |
| 6,765,470 B2 | 7/2004 | Shinzaki |
| 6,766,041 B2 | 7/2004 | Golden et al. |
| 6,775,774 B1 | 8/2004 | Harper |
| 6,785,406 B1 | 8/2004 | Kamada |
| 6,792,134 B2 | 9/2004 | Chen et al. |
| 6,793,134 B2 | 9/2004 | Clark |
| 6,819,219 B1 | 11/2004 | Bolle et al. |
| 6,829,370 B1 | 12/2004 | Pavlidis et al. |
| 6,832,044 B2 | 12/2004 | Doi et al. |
| 6,836,554 B1 | 12/2004 | Bolle et al. |
| 6,837,436 B2 | 1/2005 | Swartz et al. |
| 6,845,479 B2 | 1/2005 | Illman |
| 6,853,444 B2 | 2/2005 | Haddad |
| 6,867,683 B2 | 3/2005 | Calvesio et al. |
| 6,873,960 B1 | 3/2005 | Wood et al. |
| 6,896,187 B2 | 5/2005 | Stockhammer |
| 6,905,411 B2 | 6/2005 | Nguyen et al. |
| 6,920,237 B2 | 7/2005 | Chen et al. |
| 6,930,707 B2 | 8/2005 | Bates et al. |
| 6,934,849 B2 | 8/2005 | Kramer et al. |
| 6,950,139 B2 | 9/2005 | Fujinawa |
| 6,954,738 B2 | 10/2005 | Wang et al. |
| 6,957,341 B2 | 10/2005 | Rice et al. |
| 6,964,666 B2 | 11/2005 | Jackson |
| 6,968,457 B2 | 11/2005 | Tam |
| 6,972,797 B2 | 12/2005 | Izumi |
| 6,992,562 B2 | 1/2006 | Fuks et al. |
| 6,992,717 B2 | 1/2006 | Hatano |
| 7,003,669 B2 | 2/2006 | Monk |
| 7,017,359 B2 | 3/2006 | Kim et al. |
| 7,030,351 B2 | 4/2006 | Wasserman et al. |
| 7,031,539 B2 | 4/2006 | Tisse et al. |
| 7,043,056 B2 | 5/2006 | Edwards et al. |
| 7,053,948 B2 | 5/2006 | Konishi |
| 7,058,209 B2 | 6/2006 | Chen et al. |
| 7,071,971 B2 | 7/2006 | Elberbaum |
| 7,076,087 B2 | 7/2006 | Wakiyama |
| 7,084,904 B2 | 8/2006 | Liu et al. |
| 7,092,555 B2 | 8/2006 | Lee et al. |
| 7,095,901 B2 | 8/2006 | Lee et al. |
| 7,100,818 B2 | 9/2006 | Swaine |
| 7,113,170 B2 | 9/2006 | Lauper et al. |
| 7,114,080 B2 | 9/2006 | Rahman et al. |
| 7,120,607 B2 | 10/2006 | Bolle et al. |
| 7,125,335 B2 | 10/2006 | Rowe |
| 7,130,452 B2 | 10/2006 | Bolle et al. |
| 7,130,453 B2 | 10/2006 | Kondo et al. |
| 7,135,980 B2 | 11/2006 | Moore et al. |
| 7,136,581 B2 | 11/2006 | Fujii |

| Patent | Type | Date | Inventor |
|---|---|---|---|
| 7,145,457 | B2 | 12/2006 | Spitz et al. |
| 7,146,027 | B2 | 12/2006 | Kim et al. |
| 7,152,085 | B2 | 12/2006 | Tisse |
| 7,155,035 | B2 | 12/2006 | Kondo et al. |
| 7,169,052 | B2 | 1/2007 | Beaulieu et al. |
| 7,173,348 | B2 | 2/2007 | Voda et al. |
| 7,174,036 | B2 | 2/2007 | Ohba |
| 7,177,449 | B2 | 2/2007 | Russon et al. |
| 7,181,049 | B2 | 2/2007 | Ike |
| 7,183,895 | B2 | 2/2007 | Bazakos et al. |
| 7,184,577 | B2 | 2/2007 | Chen et al. |
| 7,187,786 | B2 | 3/2007 | Kee |
| 7,191,936 | B2 | 3/2007 | Smith et al. |
| 7,197,166 | B2 | 3/2007 | Jeng |
| 7,197,173 | B2 | 3/2007 | Jones et al. |
| 7,203,343 | B2 | 4/2007 | Manasse et al. |
| 7,204,425 | B2 | 4/2007 | Mosher, Jr. et al. |
| 7,206,431 | B2 | 4/2007 | Schuessler |
| 7,215,797 | B2 | 5/2007 | Park |
| 7,226,164 | B2 | 6/2007 | Abourizk et al. |
| 7,239,726 | B2 | 7/2007 | Li |
| 7,269,737 | B2 | 9/2007 | Robinson et al. |
| 7,271,839 | B2 | 9/2007 | Lee et al. |
| 7,272,380 | B2 | 9/2007 | Lee et al. |
| 7,272,385 | B2 | 9/2007 | Mirouze et al. |
| 7,277,561 | B2 | 10/2007 | Shin |
| 7,277,891 | B2 | 10/2007 | Howard et al. |
| 7,280,984 | B2 | 10/2007 | Phelan, III et al. |
| 7,287,021 | B2 | 10/2007 | De Smet |
| 7,298,873 | B2 | 11/2007 | Miller, Jr. et al. |
| 7,298,874 | B2 | 11/2007 | Cho |
| 7,305,089 | B2 | 12/2007 | Morikawa et al. |
| 7,309,126 | B2 | 12/2007 | Mihashi et al. |
| 7,312,818 | B2 | 12/2007 | Ooi et al. |
| 7,313,529 | B2 | 12/2007 | Thompson |
| 7,315,233 | B2 | 1/2008 | Yuhara |
| 7,331,667 | B2 | 2/2008 | Grotehusmann et al. |
| 7,333,637 | B2 | 2/2008 | Walfridsson |
| 7,333,798 | B2 | 2/2008 | Hodge |
| 7,336,806 | B2 | 2/2008 | Schonberg et al. |
| 7,338,167 | B2 | 3/2008 | Zelvin et al. |
| 7,346,195 | B2 | 3/2008 | Lauper et al. |
| 7,346,779 | B2 | 3/2008 | Leeper |
| 7,353,399 | B2 | 4/2008 | Ooi et al. |
| 7,362,210 | B2 | 4/2008 | Bazakos et al. |
| 7,362,370 | B2 | 4/2008 | Sakamoto et al. |
| 7,362,884 | B2 | 4/2008 | Willis et al. |
| 7,365,771 | B2 | 4/2008 | Kahn et al. |
| 7,380,938 | B2 | 6/2008 | Chmielewski, Jr. et al. |
| 7,391,865 | B2 | 6/2008 | Orsini et al. |
| 7,404,086 | B2 | 7/2008 | Sands et al. |
| 7,406,184 | B2 | 7/2008 | Wolff et al. |
| 7,414,648 | B2 | 8/2008 | Imada |
| 7,417,682 | B2 | 8/2008 | Kuwakino et al. |
| 7,418,115 | B2 | 8/2008 | Northcott et al. |
| 7,421,097 | B2 | 9/2008 | Hamza et al. |
| 7,436,986 | B2 | 10/2008 | Caldwell |
| 7,443,441 | B2 | 10/2008 | Hiraoka |
| 7,447,911 | B2 | 11/2008 | Chou et al. |
| 7,460,693 | B2 | 12/2008 | Loy et al. |
| 7,466,348 | B2 | 12/2008 | Morikawa et al. |
| 7,467,809 | B2 | 12/2008 | Breed et al. |
| 7,471,451 | B2 | 12/2008 | Dent et al. |
| 7,472,283 | B2 | 12/2008 | Angelo et al. |
| 7,486,306 | B2 | 2/2009 | Tsujino et al. |
| 7,486,806 | B2 | 2/2009 | Azuma et al. |
| 7,506,172 | B2 | 3/2009 | Bhakta |
| 7,512,254 | B2 | 3/2009 | Vollkommer et al. |
| 7,518,651 | B2 | 4/2009 | Butterworth |
| 7,537,568 | B2 | 5/2009 | Moehring |
| 7,538,326 | B2 | 5/2009 | Johnson et al. |
| 7,542,945 | B2 | 6/2009 | Thompson et al. |
| 7,552,333 | B2 | 6/2009 | Wheeler et al. |
| 7,580,620 | B2 | 8/2009 | Raskar et al. |
| 7,593,550 | B2 | 9/2009 | Hamza |
| 7,639,846 | B2 | 12/2009 | Yoda |
| 7,722,461 | B2 | 5/2010 | Gatto et al. |
| 7,751,598 | B2 | 7/2010 | Matey et al. |
| 7,756,301 | B2 | 7/2010 | Hamza |
| 7,756,407 | B2 | 7/2010 | Raskar |
| 7,761,453 | B2 | 7/2010 | Hamza |
| 7,777,802 | B2 | 8/2010 | Shinohara et al. |
| 7,804,982 | B2 | 9/2010 | Howard et al. |
| 8,170,293 | B2 * | 5/2012 | Tosa et al. ............ 382/117 |
| 2001/0026632 | A1 | 10/2001 | Tamai |
| 2001/0027116 | A1 | 10/2001 | Baird |
| 2001/0047479 | A1 | 11/2001 | Bromba et al. |
| 2001/0051924 | A1 | 12/2001 | Uberti |
| 2002/0010857 | A1 | 1/2002 | Karthik |
| 2002/0039433 | A1 | 4/2002 | Shin |
| 2002/0040434 | A1 | 4/2002 | Elliston et al. |
| 2002/0062280 | A1 | 5/2002 | Zachariassen et al. |
| 2002/0112177 | A1 | 8/2002 | Voltmer et al. |
| 2002/0142844 | A1 | 10/2002 | Kerr |
| 2002/0150281 | A1 | 10/2002 | Cho |
| 2002/0154794 | A1 | 10/2002 | Cho |
| 2002/0158750 | A1 | 10/2002 | Almalik |
| 2002/0175182 | A1 | 11/2002 | Matthews |
| 2002/0186131 | A1 | 12/2002 | Fettis |
| 2002/0191075 | A1 | 12/2002 | Doi et al. |
| 2002/0191076 | A1 | 12/2002 | Wada et al. |
| 2002/0194128 | A1 | 12/2002 | Maritzen et al. |
| 2002/0194131 | A1 | 12/2002 | Dick |
| 2002/0198731 | A1 | 12/2002 | Barnes et al. |
| 2003/0002714 | A1 | 1/2003 | Wakiyama |
| 2003/0012413 | A1 | 1/2003 | Kusakari et al. |
| 2003/0038173 | A1 | 2/2003 | Blackson et al. |
| 2003/0046228 | A1 | 3/2003 | Berney |
| 2003/0055689 | A1 | 3/2003 | Block et al. |
| 2003/0055787 | A1 | 3/2003 | Fujii |
| 2003/0065626 | A1 | 4/2003 | Allen |
| 2003/0071743 | A1 | 4/2003 | Seah et al. |
| 2003/0072475 | A1 | 4/2003 | Tamori |
| 2003/0073499 | A1 | 4/2003 | Reece |
| 2003/0074317 | A1 | 4/2003 | Hofi |
| 2003/0074326 | A1 | 4/2003 | Byers |
| 2003/0080194 | A1 | 5/2003 | O'Hara et al. |
| 2003/0092489 | A1 | 5/2003 | Veradej |
| 2003/0098776 | A1 | 5/2003 | Friedli |
| 2003/0099379 | A1 | 5/2003 | Monk et al. |
| 2003/0107097 | A1 | 6/2003 | McArthur et al. |
| 2003/0107645 | A1 | 6/2003 | Yoon |
| 2003/0115148 | A1 | 6/2003 | Takhar |
| 2003/0116630 | A1 | 6/2003 | Carey et al. |
| 2003/0118212 | A1 | 6/2003 | Min et al. |
| 2003/0125054 | A1 | 7/2003 | Garcia |
| 2003/0125057 | A1 | 7/2003 | Pesola |
| 2003/0126560 | A1 | 7/2003 | Kurapati et al. |
| 2003/0131245 | A1 | 7/2003 | Linderman |
| 2003/0133597 | A1 | 7/2003 | Moore et al. |
| 2003/0140235 | A1 | 7/2003 | Immega et al. |
| 2003/0140928 | A1 | 7/2003 | Bui et al. |
| 2003/0141411 | A1 | 7/2003 | Pandya et al. |
| 2003/0149881 | A1 | 8/2003 | Patel et al. |
| 2003/0152251 | A1 | 8/2003 | Ike |
| 2003/0156741 | A1 | 8/2003 | Lee et al. |
| 2003/0158762 | A1 | 8/2003 | Wu |
| 2003/0158821 | A1 | 8/2003 | Maia |
| 2003/0159051 | A1 | 8/2003 | Hollnagel |
| 2003/0163739 | A1 | 8/2003 | Armington et al. |
| 2003/0169334 | A1 | 9/2003 | Braithwaite et al. |
| 2003/0174049 | A1 | 9/2003 | Beigel et al. |
| 2003/0177051 | A1 | 9/2003 | Driscoll et al. |
| 2003/0182151 | A1 | 9/2003 | Taslitz |
| 2003/0182182 | A1 | 9/2003 | Kocher |
| 2003/0189480 | A1 | 10/2003 | Hamid |
| 2003/0189481 | A1 | 10/2003 | Hamid |
| 2003/0191949 | A1 | 10/2003 | Odagawa |
| 2003/0194112 | A1 | 10/2003 | Lee |
| 2003/0210139 | A1 | 11/2003 | Brooks et al. |
| 2003/0225711 | A1 | 12/2003 | Paping |
| 2003/0236120 | A1 | 12/2003 | Reece et al. |
| 2004/0002894 | A1 | 1/2004 | Kocher |
| 2004/0005078 | A1 | 1/2004 | Tillotson |
| 2004/0006553 | A1 | 1/2004 | de Vries et al. |
| 2004/0010462 | A1 | 1/2004 | Moon et al. |
| 2004/0025030 | A1 | 2/2004 | Corbett-Clark et al. |
| 2004/0025053 | A1 | 2/2004 | Hayward |

| | | |
|---|---|---|
| 2004/0030930 A1 | 2/2004 | Nomura |
| 2004/0037450 A1 | 2/2004 | Bradski |
| 2004/0039914 A1 | 2/2004 | Barr et al. |
| 2004/0042641 A1 | 3/2004 | Jakubowski |
| 2004/0044627 A1 | 3/2004 | Russell et al. |
| 2004/0046640 A1 | 3/2004 | Jourdain et al. |
| 2004/0050924 A1 | 3/2004 | Mletzko et al. |
| 2004/0050930 A1 | 3/2004 | Rowe |
| 2004/0052405 A1 | 3/2004 | Walfridsson |
| 2004/0052418 A1 | 3/2004 | DeLean |
| 2004/0059590 A1 | 3/2004 | Mercredi et al. |
| 2004/0059953 A1 | 3/2004 | Purnell |
| 2004/0117636 A1 | 6/2004 | Cheng |
| 2004/0133804 A1 | 7/2004 | Smith et al. |
| 2004/0160518 A1 | 8/2004 | Park |
| 2004/0162870 A1 | 8/2004 | Matsuzaki et al. |
| 2004/0162984 A1 | 8/2004 | Freeman et al. |
| 2004/0172541 A1 | 9/2004 | Ando et al. |
| 2004/0193893 A1 | 9/2004 | Braithwaite et al. |
| 2004/0233038 A1 | 11/2004 | Beenau et al. |
| 2004/0252866 A1 | 12/2004 | Tisse et al. |
| 2004/0255168 A1 | 12/2004 | Murashita et al. |
| 2005/0008201 A1 | 1/2005 | Lee et al. |
| 2005/0012817 A1 | 1/2005 | Hampapur et al. |
| 2005/0029353 A1 | 2/2005 | Isemura et al. |
| 2005/0052566 A1 | 3/2005 | Kato |
| 2005/0055582 A1 | 3/2005 | Bazakos et al. |
| 2005/0063567 A1 | 3/2005 | Saitoh et al. |
| 2005/0069219 A1* | 3/2005 | Wu ............................. 382/274 |
| 2005/0084137 A1 | 4/2005 | Kim et al. |
| 2005/0084179 A1 | 4/2005 | Hanna et al. |
| 2005/0102502 A1 | 5/2005 | Sagen |
| 2005/0125258 A1 | 6/2005 | Yellin et al. |
| 2005/0129286 A1 | 6/2005 | Hekimian |
| 2005/0138385 A1 | 6/2005 | Friedli et al. |
| 2005/0138387 A1 | 6/2005 | Lam et al. |
| 2005/0146640 A1 | 7/2005 | Shibata |
| 2005/0151620 A1 | 7/2005 | Neumann |
| 2005/0152583 A1 | 7/2005 | Kondo et al. |
| 2005/0193212 A1 | 9/2005 | Yuhara |
| 2005/0199708 A1 | 9/2005 | Friedman |
| 2005/0206501 A1 | 9/2005 | Farhat |
| 2005/0206502 A1 | 9/2005 | Bernitz |
| 2005/0210267 A1 | 9/2005 | Sugano et al. |
| 2005/0210270 A1 | 9/2005 | Rohatgi et al. |
| 2005/0238214 A1 | 10/2005 | Matsuda et al. |
| 2005/0240778 A1 | 10/2005 | Saito |
| 2005/0248725 A1 | 11/2005 | Ikoma et al. |
| 2005/0249385 A1 | 11/2005 | Kondo et al. |
| 2005/0255840 A1 | 11/2005 | Markham |
| 2006/0093190 A1 | 5/2006 | Cheng et al. |
| 2006/0147094 A1 | 7/2006 | Yoo |
| 2006/0165266 A1 | 7/2006 | Hamza |
| 2006/0274919 A1 | 12/2006 | LoIacono et al. |
| 2007/0036397 A1* | 2/2007 | Hamza ............................. 382/117 |
| 2007/0140531 A1 | 6/2007 | Hamza |
| 2007/0160266 A1 | 7/2007 | Jones et al. |
| 2007/0189582 A1 | 8/2007 | Hamza et al. |
| 2007/0206840 A1 | 9/2007 | Jacobson |
| 2007/0211924 A1 | 9/2007 | Hamza |
| 2007/0274570 A1* | 11/2007 | Hamza ............................. 382/117 |
| 2007/0274571 A1 | 11/2007 | Hamza |
| 2007/0286590 A1 | 12/2007 | Terashima |
| 2008/0005578 A1 | 1/2008 | Shafir |
| 2008/0075334 A1 | 3/2008 | Determan et al. |
| 2008/0075441 A1 | 3/2008 | Jelinek et al. |
| 2008/0075445 A1 | 3/2008 | Whillock et al. |
| 2008/0104415 A1 | 5/2008 | Palti-Wasserman et al. |
| 2008/0148030 A1 | 6/2008 | Goffin |
| 2008/0211347 A1 | 9/2008 | Wright et al. |
| 2008/0252412 A1 | 10/2008 | Larsson et al. |
| 2009/0046899 A1 | 2/2009 | Northcott et al. |
| 2009/0092283 A1 | 4/2009 | Whillock et al. |
| 2009/0316993 A1 | 12/2009 | Brasnett et al. |
| 2010/0033677 A1 | 2/2010 | Jelinek |
| 2010/0034529 A1 | 2/2010 | Jelinek |
| 2010/0182440 A1 | 7/2010 | McCloskey |
| 2010/0239119 A1 | 9/2010 | Bazakos et al. |

FOREIGN PATENT DOCUMENTS

| | | |
|---|---|---|
| EP | 0878780 | 11/1998 |
| EP | 0899680 | 3/1999 |
| EP | 0910986 | 4/1999 |
| EP | 0962894 | 12/1999 |
| EP | 1018297 | 7/2000 |
| EP | 1024463 | 8/2000 |
| EP | 1028398 | 8/2000 |
| EP | 1041506 | 10/2000 |
| EP | 1041523 | 10/2000 |
| EP | 1126403 | 8/2001 |
| EP | 1139270 | 10/2001 |
| EP | 1237117 | 9/2002 |
| EP | 1477925 | 11/2004 |
| EP | 1635307 | 3/2006 |
| GB | 2369205 | 5/2002 |
| GB | 2371396 | 7/2002 |
| GB | 2375913 | 11/2002 |
| GB | 2402840 | 12/2004 |
| GB | 2411980 | 9/2005 |
| JP | 9161135 | 6/1997 |
| JP | 9198545 | 7/1997 |
| JP | 9201348 | 8/1997 |
| JP | 9147233 | 9/1997 |
| JP | 9234264 | 9/1997 |
| JP | 9305765 | 11/1997 |
| JP | 9319927 | 12/1997 |
| JP | 10021392 | 1/1998 |
| JP | 10040386 | 2/1998 |
| JP | 10049728 | 2/1998 |
| JP | 10137219 | 5/1998 |
| JP | 10137221 | 5/1998 |
| JP | 10137222 | 5/1998 |
| JP | 10137223 | 5/1998 |
| JP | 10248827 | 9/1998 |
| JP | 10269183 | 10/1998 |
| JP | 11047117 | 2/1999 |
| JP | 11089820 | 4/1999 |
| JP | 11200684 | 7/1999 |
| JP | 11203478 | 7/1999 |
| JP | 11213047 | 8/1999 |
| JP | 11339037 | 12/1999 |
| JP | 2000005149 | 1/2000 |
| JP | 2000005150 | 1/2000 |
| JP | 2000011163 | 1/2000 |
| JP | 2000023946 | 1/2000 |
| JP | 2000083930 | 3/2000 |
| JP | 2000102510 | 4/2000 |
| JP | 2000102524 | 4/2000 |
| JP | 2000105830 | 4/2000 |
| JP | 2000107156 | 4/2000 |
| JP | 2000139878 | 5/2000 |
| JP | 2000155863 | 6/2000 |
| JP | 2000182050 | 6/2000 |
| JP | 2000185031 | 7/2000 |
| JP | 2000194972 | 7/2000 |
| JP | 2000237167 | 9/2000 |
| JP | 2000242788 | 9/2000 |
| JP | 2000259817 | 9/2000 |
| JP | 2000356059 | 12/2000 |
| JP | 2000357232 | 12/2000 |
| JP | 2001005948 | 1/2001 |
| JP | 2001067399 | 3/2001 |
| JP | 2001101429 | 4/2001 |
| JP | 2001167275 | 6/2001 |
| JP | 2001222661 | 8/2001 |
| JP | 2001292981 | 10/2001 |
| JP | 2001297177 | 10/2001 |
| JP | 2001358987 | 12/2001 |
| JP | 2002119477 | 4/2002 |
| JP | 2002133415 | 5/2002 |
| JP | 2002153444 | 5/2002 |
| JP | 2002153445 | 5/2002 |
| JP | 2002260071 | 9/2002 |
| JP | 2002271689 | 9/2002 |
| JP | 2002286650 | 10/2002 |
| JP | 2002312772 | 10/2002 |
| JP | 2002329204 | 11/2002 |
| JP | 2003006628 | 1/2003 |

| | | |
|---|---|---|
| JP | 2003036434 | 2/2003 |
| JP | 2003108720 | 4/2003 |
| JP | 2003108983 | 4/2003 |
| JP | 2003132355 | 5/2003 |
| JP | 2003150942 | 5/2003 |
| JP | 2003153880 | 5/2003 |
| JP | 2003242125 | 8/2003 |
| JP | 2003271565 | 9/2003 |
| JP | 2003271940 | 9/2003 |
| JP | 2003308522 | 10/2003 |
| JP | 2003308523 | 10/2003 |
| JP | 2003317102 | 11/2003 |
| JP | 2003331265 | 11/2003 |
| JP | 2004005167 | 1/2004 |
| JP | 2004021406 | 1/2004 |
| JP | 2004030334 | 1/2004 |
| JP | 2004038305 | 2/2004 |
| JP | 2004094575 | 3/2004 |
| JP | 2004152046 | 5/2004 |
| JP | 2004163356 | 6/2004 |
| JP | 2004164483 | 6/2004 |
| JP | 2004171350 | 6/2004 |
| JP | 2004171602 | 6/2004 |
| JP | 2004206444 | 7/2004 |
| JP | 2004220376 | 8/2004 |
| JP | 2004261515 | 9/2004 |
| JP | 2004280221 | 10/2004 |
| JP | 2004280547 | 10/2004 |
| JP | 2004287621 | 10/2004 |
| JP | 2004315127 | 11/2004 |
| JP | 2004318248 | 11/2004 |
| JP | 2005004524 | 1/2005 |
| JP | 2005011207 | 1/2005 |
| JP | 2005025577 | 1/2005 |
| JP | 2005038257 | 2/2005 |
| JP | 2005062990 | 3/2005 |
| JP | 2005115961 | 4/2005 |
| JP | 2005148883 | 6/2005 |
| JP | 2005242677 | 9/2005 |
| WO | WO 97/17674 | 5/1997 |
| WO | WO 97/21188 | 6/1997 |
| WO | WO 98/02083 | 1/1998 |
| WO | WO 98/08439 | 3/1998 |
| WO | WO 99/32317 | 7/1999 |
| WO | WO 99/52422 | 10/1999 |
| WO | WO 99/65175 | 12/1999 |
| WO | WO 00/28484 | 5/2000 |
| WO | WO 00/29986 | 5/2000 |
| WO | WO 00/31677 | 6/2000 |
| WO | WO 00/36605 | 6/2000 |
| WO | WO 00/62239 | 10/2000 |
| WO | WO 01/01329 | 1/2001 |
| WO | WO 01/03100 | 1/2001 |
| WO | WO 01/28476 | 4/2001 |
| WO | WO 01/35348 | 5/2001 |
| WO | WO 01/35349 | 5/2001 |
| WO | WO 01/40982 | 6/2001 |
| WO | WO 01/63994 | 8/2001 |
| WO | WO 01/69490 | 9/2001 |
| WO | WO 01/86599 | 11/2001 |
| WO | WO 02/01451 | 1/2002 |
| WO | WO 02/19030 | 3/2002 |
| WO | WO 02/35452 | 5/2002 |
| WO | WO 02/35480 | 5/2002 |
| WO | WO 02/091735 | 11/2002 |
| WO | WO 02/095657 | 11/2002 |
| WO | WO 03/002387 | 1/2003 |
| WO | WO 03/003910 | 1/2003 |
| WO | WO 03/054777 | 7/2003 |
| WO | WO 03/077077 | 9/2003 |
| WO | WO 2004/029863 | 4/2004 |
| WO | WO 2004/042646 | 5/2004 |
| WO | WO 2004/055737 | 7/2004 |
| WO | WO 2004/089214 | 10/2004 |
| WO | WO 2004/097743 | 11/2004 |
| WO | WO 2005/008567 | 1/2005 |
| WO | WO 2005/013181 | 2/2005 |
| WO | WO 2005/024698 | 3/2005 |
| WO | WO 2005/024708 | 3/2005 |
| WO | WO 2005/024709 | 3/2005 |
| WO | WO 2005/029388 | 3/2005 |
| WO | WO 2005/062235 | 7/2005 |
| WO | WO 2005/069252 | 7/2005 |
| WO | WO 2005/093510 | 10/2005 |
| WO | WO 2005/093681 | 10/2005 |
| WO | WO 2005/096962 | 10/2005 |
| WO | WO 2005/098531 | 10/2005 |
| WO | WO 2005/104704 | 11/2005 |
| WO | WO 2005/109344 | 11/2005 |
| WO | WO 2006/012645 | 2/2006 |
| WO | WO 2006/023046 | 3/2006 |
| WO | WO 2006/051462 | 5/2006 |
| WO | WO 2006/063076 | 6/2006 |
| WO | WO 2006/081209 | 8/2006 |
| WO | WO 2006/081505 | 8/2006 |
| WO | WO 2007/101269 | 9/2007 |
| WO | WO 2007/101275 | 9/2007 |
| WO | WO 2007/101276 | 9/2007 |
| WO | WO 2007/103698 | 9/2007 |
| WO | WO 2007/103701 | 9/2007 |
| WO | WO 2007/103833 | 9/2007 |
| WO | WO 2007/103834 | 9/2007 |
| WO | WO 2008/016724 | 2/2008 |
| WO | WO 2008/019168 | 2/2008 |
| WO | WO 2008/019169 | 2/2008 |
| WO | WO 2008/021584 | 2/2008 |
| WO | WO 2008/031089 | 3/2008 |
| WO | WO 2008/040026 | 4/2008 |

OTHER PUBLICATIONS

Avcibas et al., "Steganalysis Using Image Quality Metrics," IEEE Transactions on Image Processing, vol. 12, No. 2, pp. 221-229, Feb. 2003.

Boles, "A Security System Based on Human Iris Identification Using Wavelet Transform," IEEE First International Conference on Knowledge-Based Intelligent Electronic Systems, May 21-23, Adelaide, Australia, pp. 533-541, 1997.

Bonney et al., "Iris Pattern Extraction Using Bit Planes and Standard Deviations," IEEE, pp. 582-586, 2004.

Camus et al., "Reliable and Fast Eye Finding in Close-up Images," IEEE, pp. 389-394, 2002.

Carson et al., "Blobworld: Image Segmentation Using Expectation-Maximization and Its Application to Image Querying," IEEE Transactions on Pattern Analysis and Machine Intellitence, vol. 24, No. 8, pp. 1026-1038, Aug. 2002.

Cui et al., "A Fast and Robust his Localization Method Based on Texture Segmentation," 8 pages, 2004.

Cui et al., "An Appearance-Based Method for Iris Detection," 6 pages, 2004.

Cui et al., "An Iris Detection Method Based on Structure Information," Advances in Biometric Person Authentication, International Workshop on Biometric Recognition Systems, IWBRS 2005, Beijing China, 10 pages, Oct. 22-23, 2005.

Cui et al., "An Iris Image Synthesis Method Based on PCA and Super-Resolution," IEEE Computer Society, Proceedings of the 17th International Conference on Pattern Recognition, 6 pages, Aug. 23-26, 2004.

Cui et al., "An Iris Recognition Algorithm Using Local Extreme Points," Biometric Authentication, First International Conference, ICBA 2004, Hong Kong, China, 10 pages, Jul. 15-17, 2004.

Daugman, "Results From 200 Billion Iris Cross-Comparisons," University of Cambridge Computer Laborator , Technical Resort, No. 635, 8 pages, Jun. 2005.

Daugman, "How Iris Recognition Works," IEEE 2002 International Conference on Image Processing, vol. I of III, 6 pages, Sep. 22-25, 2002.

Du et al., "A One-Dimensional Approach for Iris Identification," 11 pages, prior to Jan. 25, 2006.

Guo et al., "A System for Automatic Iris Capturing," Mitsubishi Electric Research Laboratories, Inc., 10 pages, 2005.

Guo, "Face, Expression, and Iris Recognition Using Learning-Based Approaches," 132 pages, 2006.

http://www.newscientisttech.com/article/dn11110-invention-covert-iris-sc, "Invention: Covert Iris Scanner," 3 pages, printed Feb. 8, 2007.

Huang et al., "Iris Model Based on Local Orientation Description," 5 pages, prior to Jan. 25, 2006.

Huang et al., "An Efficient Iris Recognition System," IEEE Proceedings of the First International Conference on Machine Learning and Cybernetics, Beijing, pp. 450-454, Nov. 4-5, 2002.

Jalaja et al., "Texture Element Feature Characterizations for CBIR," IEEE, pp. 733-736, 2005.

Kalka et al., "Image Quality Assessment for Iris Biometric," Proc. of SPIE vol. 6202 62020D, 11 pages, 2006.

Ko et al., "Monitoring and Reporting of Fingerprint Image Quality and Match Accuracy for a Large User Application," IEEE Computer Society, Proceedings of the 33$^{rd}$ Applied Imagery Pattern Recognition Workshop, 6 pages, 2004.

Lau et al., "Finding a Small Number of Regions on an Image Using Low-Level Features," Pattern Recognition 35, pp. 2323-2339, 2002.

Ma et al., "Personal Identification Based on Iris Texture Analysis," IEEE Transactions on Pattern Analysis and Machine Intellitence, vol. 25, No. 12, pp. 1519-1533, Dec. 2003.

Masek, "Recognition of Human Iris Patterns for Biometric Identification," 61 pages, 2003.

Maurer et al., "Tracking and Learning Graphs and Pose on Image Sequences of Faces," IEEE Computer Society Press, International Conference on Automatic Face and Gesture Recognition, pp. 176-181, Oct. 14-16, 1996.

Oppenheim et al, "The Importance of Phase in Signals," Proceedings of the IEEE, vol. 69, No. 5, pp. 529-541, 1981.

Ratha et al., "A Real-Time Matching System for Large Fingerprint Databases," IEEE Transactions on Pattern Analysis, and Machine Intellitence, vol. 18, No. 8, pp. 799-812, Aug. 1996.

Sony, "Network Color Camera, SNC-RZ30N (NTSC)," 6 pages, Aug. 2002.

Sun et al., "Robust Encoding of Local Ordinal Measures: A General Framework of Iris Recognition," 13 pages, prior to Jan. 25, 2006.

Wang et al, "Image Quality Assessment: From Error Visibility to Structural Similarity," IEEE Transactions on Image Processinl, vol. 13, No. 4, pp. 600-612, Apr. 2004.

Wang et al., "A Universal Image Quality Index," IEEE Signal Processing Letters, vol. 9, No. 3, pp. 81-84, Mar. 2002.

Wang et al., "Local Phase Coherence and the Perception of Blur," Advances in Nueral Information Processing Systems 16, pp. 1435-1442, 2004.

AOptix Technologies, "Introducing the AOptix InSight 2 Meter Iris Recognition System," 6 pages, 2010.

Belhumeur et al., "Eigenfaces Vs. Fisherfaces: Recognition Using Class Specific Linear Projection," 14 pages, prior to Jun. 11, 2010.

Bentley et al., "Multidimensional Binary Search Trees Used for Associative Searching," Communications of the ACM, vol. 18, No. 9, pp. 509-517, Sep. 1975.

Blackman et al., "Chapter 9, Multiple Sensor Tracking: Issues and Methods," Design and Analysis of Modern Tracking Systems, Artech House, pp. 595-659, 1999.

Brasnett et al., "A Robust Visual Identifier Using the Trace Transform," 6 pages, prior to Jun. 11, 2010.

Buades et al., "A Review of Image Denoising Algorithms, with a New One," Multiscale Modeling & Simulation, vol. 4, No. 2, pp. 490-530, 2005.

Chen et al., "Localized Iris Image Quality Using 2-D Wavelets," LNCS vol. 3832, pp. 373-381, 2005.

Chow et al., "Towards a System for Automatic Facial Feature Detection," Pattern Recognition vol. 26, No. 12, pp. 1739-1755, 1993.

U.S. Appl. No. 12/792,498, filed Jun. 2, 2010.

U.S. Appl. No. 12/814,272, filed Jun. 11, 2010.

Cula et al., "Bidirectional Imaging and Modeling of Skin Texture," Proceedings of Texture 2003, 6 pages, Oct. 17, 2003.

Cula et al., "Bidirectional Imaging and Modeling of Skin Texture," IEEE Transactions on Biomedical Engineering, vol. 51, No. 12, pp. 2148-2159, 2004.

Cula et al., "Compact Representation of Bidirectional Texture Functions," Proceedings of IEEE Computer Societ Conference on Computer Vision and Pattern Recognition 2001, 8 pages, 2001.

Cula et al., "Skin Texture Modeling," International Journal of Computer Vision 2004, 34 pages, 2004.

Dabov et al., "Image Denoising by Sparse 3-D Transform-Domain Collaborative Filtering," IEEE Transactions on Image Processing vol. 16, No. 8, pp. 2080-2095, Aug. 2007.

Dabov et al., "Image Restoration by Spars 3D Transform Collaborative Filtering," SPIE vol. 6812 681207-1, 12 pages, 2008.

Daugman, "High Confidence Visual Recognition of Persons by a Test of Statistical Independence," IEEE Transactions on Pattern Analysis and Machine Intelligence, vol. 15, No. 11, pp. 1148-1161, 1993.

Daugman, "Probing the Uniqueness and Randomness of Iris Codes: Results from 200 Billion Iris Pair Comparisons," Proceedings of the IEEE vol. 94, No. 11, pp. 1928-1935, Nov. 2006.

Fooprateepsiri et al., "A Highly Robust Method for Face Authentication," IEEE 2009 First Asian Conference on Intelligent Information and Database Systems, pp. 380-385, 2009.

Fooprateepsiri et al., "Face Verification Base-On Hausdorff-Shape Context," IEEE 2009 Asia Conference on Informatics in Control, Automation and Robotics, pp. 240-244, 2009.

Forstner et al., "A Metric for Covariance Matrices," 16 pages, prior to Jun. 11, 2010.

Gan et al., "Applications of Wavelet Packets Decomposition in Iris Recognition," LNCS vol. 3832, pp. 443-449, 2005.

Hampapur et al., "Smart Surveillance: Applications, Technologies and Implications," IEEE, 6 pages, Dec. 15-18, 2003.

Hamza et al., "Standoff Iris Recognition Usin Non-Iterative Polar Based Segmentation," Proceedings of SPIE vol. 6944, 8 pages, 2008.

Hanna et al., "A System for Non-Intrusive Human Iris Acquisition and Identification," IAPR Workshop on Machine Vision Applications, pp. 200-203, Nov. 12-14, 1996.

http://en.wikipedia.org/wiki/Radon_transform, "Radon Transform," 5 pages, printed May 14, 2010.

Ivins et al., "A Deformable Model of the Human Iris for Measuring Small Three-Dimensional Eye Movements," Machine Vision and Applications, vol. 11, pp. 42-51, 1998.

Kadyrov et al., "The Trace Transform and Its Applications," IEEE Transactions on Pattern Analysis and Machine Intelligence, vol. 23, No. 8, pp. 811-828, Aug. 2001.

Kadyrov et al., "The Trace Transform as a Tool to Invariant Feature Construction," 3 pages, prior to Jun. 11, 2010.

Kang et al., "Improved Dual Action Contour for Iris Recognition," 10 pages, prior to Jun.11, 2010.

Kawaguchi et al., "Detection of Eyes from Human Faces by Hough Transform and Separability Filter," IEEE, 4 pages, 2000.

Kong et al., "Detecting Eyelash and Reflection for Accurate Iris Segmentation," International Journal of Pattern Recognition and Artificial Intelligence, vol. 17, No. 6, pp. 1025-1034, 2003.

Li et al., "Appearance Modeling Using a Geometric Transform," IEEE Transactions on Image Processing, 17 pages, 2008.

Li et al., "Appearance Modeling Using a Geometric Transform," Journal Preparation for IEEE Transactions on Image Processing, 30 pages, Nov. 5, 2006.

Ma et al., "Local Intensity Variation Analysis for Iris Recognition," Pattern Recognition, vol. 37, pp. 1287-1298, 2004.

Ma et al., "Video Sequence Querying Using Clustering of Objects' Appearance Models," Advances in Visual Computing Third Annual Symposium, ISVC 2007, 14 pages, 2007.

Monro et al., "DCT-Based Iris Recognition," IEEE Transactions on Pattern Analysis and Machine Intelligence, vol. 29, No. 4, Apr. 2007.

Noh et al., "A Novel Method to Extract Features for Iris Recognition System," AVBPA 2003, LNCS 2688, pp. 862-868, 2003.

Ojala et al., "Multiresolution Gray-Scale and Rotation Invariant Texture Classification with Local Binary Patterns," IEEE Transactions on Pattern Analysis and Machine Intelligence, vol. 24, No. 7, 18 pages, Jul. 2002.

Pamudurthy et al., "Dynamic Approach for Face Recognition Using Digital Image Skin Correlation," Audio and Video Based Person Authentication 5$^{th}$ International Conference, AVBPA 2005, Hilton Rye Town, NY, USA, 11 pages, Jul. 20-22, 2005.

Petrou et al., "The Trace Transform in a Nutshell," 9 pages, prior to Jun. 11, 2010.

Phillips et al., "FRVT 2006 and ICE 2006 Larle-Scale Results," 56 pages, Mar. 2007.

Porikli et al., "Covariance Tracking Using Model Update Based on Means on Riemannian Manifolds," 8 pages, prior to Jun. 11, 2010.

Proenca et al., "Toward Noncooperative Iris Recognition: A Classification Approach Using Multiple Signatures," IEEE Transactions on Patern Analysis and Machine Intellingence, vol. 29, No. 4, pp. 607-612, Apr. 2007.

Ross et al., "Segmenting Non-Ideal Irises Using Geodesic Active Contours," IEEE 2006 Biometrics Symposium, 3 pages, 2006.

Shapiro et al., pp. 556-559 in Book Entitled "Computer Vision," Prentice Hall, prior to Jun. 11, 2010.

Stillman et al., "A System for Tracking and Recognizing Multiple People with Multiple Cameras," 6 pages, Aug. 1998.

Sun et al., "Iris Recognition Based on Non-local Comparisons," Sinobiometrics 2004, LNCS 3338, pp. 67-77, 2004.

Suzaki et al., "A Horse Identification System Using Biometrics," Systems and Computer in Japan, vol. 32, No. 14, pp. 12-23, 2001.

Trucco et al., "Robust Iris Location in Close-up Images of the Eye," Pattern Anal. Applic. vol. 8, pp. 247-255, 2005.

Turan et al., "Trace Transform Based Invariant Object Recognition System," 4 pages, prior to Jun. 11, 2010.

Turk et al., "Eigenfaces for Recognition," Journal of Cognitive Neuroscience, vol. 3, No. 1, 16 pages, 1991.

Wang et al., "Recent Developments in Human Motion Analysis," Pattern Recognition, vol. 36, pp. 585-601, 2003.

Wei et al., "Robust and Fast Assessment of Iris Image Quality," LNCS vol. 3832, pp. 464-471, 2005.

Zhao et al., "Dynamic Texture Recognition Using Local Binary Patterns with an Application to Facial Expressions," IEEE Transactions on Pattern Analysis and Machine Intelligence, vol. 29, No. 6, pp. 915-928, Jun. 2007.

Zhi-Hui et al., "Research Iris Serial Images Quality Assessment Method Based on HVS," Proceedings of SPIE, vol. 6034, 6 pages, 2006.

U.S. Appl. No. 13/077,821, filed Mar. 30, 2011.

Freeboy, "Adaptive Optics Speeds Up Airport Immigration," Optics.org/ole, 2 pages, Jan. 2009.

http://www.imagine-eyes.com/content/view/100/115/, "INOVEO—Ultra-High Resolution Retinal Imaging with Adaptive Optics," 2 pages, printed Feb. 22, 2010.

* cited by examiner

IRIS AND OCULAR RECOGNITION SYSTEM USING TRACE TRANSFORMS

This application claims the benefit of U.S. Provisional Patent Application No. 61/268,676, filed Jun. 15, 2009, and entitled "Iris and Ocular Recognition Using Radon and Trace Transforms". U.S. Provisional Patent Application No. 61/268,676, filed Jun. 15, 2009, is hereby incorporated by reference.

BACKGROUND

The present invention pertains to recognition systems and particularly to biometric recognition systems; in particular the invention pertains to iris recognition systems.

SUMMARY

The invention is an iris and ocular recognition system using trace transforms. The system may capture an eye image with an acquisition module and provide it to an image quality metrics determination module which provides a quality evaluation of the image. The quality evaluation may determine whether the image goes to an iris recognition module or a trace transform module. If the quality evaluation reaches a predefined of iris quality measure, the image may be primarily processed using the iris recognition module. If the quality evaluation does not reach a predefined iris quality level for the iris recognition module, the image may be processed primarily using trace transform module. If the quality evaluation is too poor for the trace transform module, the image may be rejected subject to rehabilitation or reacquisition. In a different approach, one may still need to process the eye image using both modules but the fusion of the matching outcome will be weighted based upon the quality of the iris. In this approach, the trace module may be used to augment the iris recognition module. A processed image from the iris recognition module may be lined up with an only best match. A processed image from the trace transform module may be lined up instead with the most probable matches.

DESCRIPTION

Figures 1A, 1B:
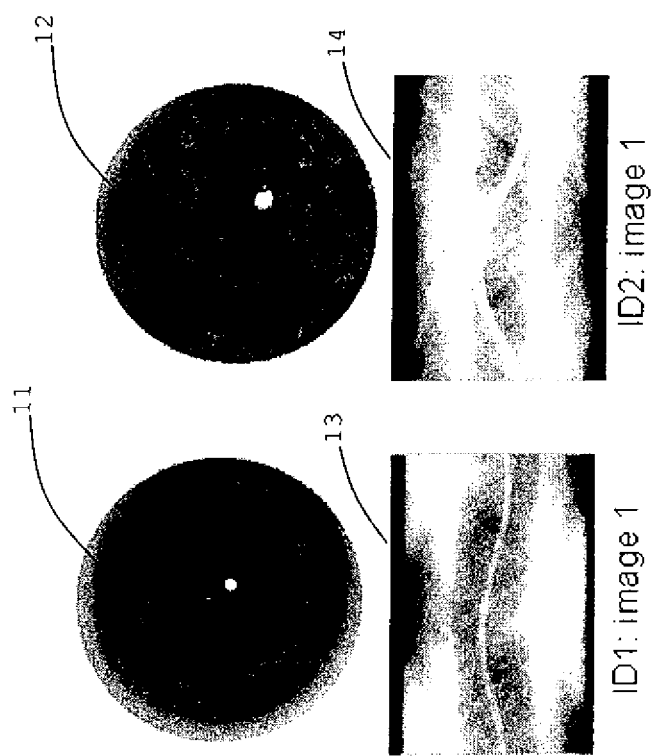
FIGS. 1a and 1b are diagrams of example irises and their respective trace signatures.

The iris of the human eye has been used as a biometric indicator for identification. The pattern of an iris is complex and can contain many distinctive features such as arching ligaments, furrows, ridges, crypts, rings, corona, freckles, a zigzag collaret, and other distinctive features. The iris of every human eye has a unique texture of high complexity, which is essentially stable over a person's life. No two irises are identical in texture or detail, even in the same person. As an internal organ of the eye, the iris is well protected from the external environment, yet it is easily visible even from yards away as a colored disk, behind the clear protective window of the eye's cornea, surrounded by the white tissue of the eye.

One may also note that the proximal eye skin texture and the eye appearance around the iris are unique to the person's identity. Skin texture modeling has been investigated in many applications including computer assisted diagnosis for dermatology, and topical drug efficacy testing. The ability to recognize or classify a skin texture and the holistic view of the eye may be a biometric enabler.

Although the iris stretches and contracts to adjust the size of the pupil in response to light, its detailed texture remains largely unaltered apart from stretching and shrinking. The eye may also stretch and change in form locally. Such distortions can readily be reversed mathematically in analyzing an eye image to extract and encode an ID signature that remains the same over a wide range of pupillary dilations or eye signal variations. The richness, uniqueness, and immutability of iris texture, as well as its external visibility skin and its surrounding appearance, make the combined iris/ocular recognition suitable for automated and highly reliable personal identification.

One may introduce the ocular system that augments iris recognition with ocular features extracted from both the eye proximal skin and the holistic eye appearance. The present approach may be based on using the Trace transform or Radon transform to extract features from the iris map (eye print) as well as from the proximal skin texture around the eye. Other transforms may be used to extract the features.

The Trace transform may be used in image processing for recognizing objects under transformations, i.e., nonlinear or linear transforms. One of the key properties of the Trace transform is that it may be used to construct features invariant to these transformations. It is known for picking up shape as well as the texture characteristics of the described object. One may here apply the key features of the Trace transform operator to map the features of the iris and the eye to the Trace space. To produce Trace transforms, one may compute a functional along tracing lines of a masked eye image. One may mask the eye image in order to select only the significant features of importance from the eye Trace transform. For the iris tracing, one may mask the pupil to exclude the pupil reflection side effect. As one processes eyes/irises, one may wish to recognize a framed circular eye shape to eliminate any extraneous information from the computation of the Trace transform. For this purpose, one may define a local coordinate system with its center at the proximal pupil center (other considerations especially for gazed eye tracing to pick the center at the limbic middle point regardless of the pupil off-angle to reduce the side effect of heavy gazing).

One may apply normalization processes to both iris and eye feature extraction processes. The iris normalization process may be based on the rubber sheet model. In addition, one may apply a linear transform to convert elliptic shapes of an iris to a circular model prior to applying the Trace transforms to reduce side effects of the elliptic shape. One may also apply a normalization process around the eye to isolate the actual proximal skin region in a digital eye image. One may extract the edge points of the upper and lower eyelids. The upper and lower edges may then be fit into two separate parabola models to delineate the lids limits. The intersections between these two curves may then be used as the reference points to execute the normalization among different templates. The eye proximal skin may also be fit into a circular mask.

In practice, the introduced approach may best be integrated along with an iris recognition system to produce and base the recognition on multiple signatures rather than just the usual iris barcode. One may cast the ocular recognition challenge as one of classifying among two feature sets extracted from iris patterns and proximal and eye skin texture and eye appearance using Trace space representation. The system should include at least the following components.

1) Iris recognition—this may be a typical iris recognition technique that can be processed using a commercial system or a polar segmentation (viz., POSE) system technique (see e.g., U.S. patent application Ser. No. 11/043,366, filed Jan. 26, 2005). This approach may provide a useful signature only if the data is ideal with no heavy obscuration or blurring.

2) Iris recognition using Trace space—the signature from this approach may be mostly useful when the above signature is obscured.

3) Proximal skin texture and face appearance recognition—this approach may extract features from the iris proximal skin texture by analyzing a holistic view of the eye appearance as well as the texture patterns of the skin around the eye and analyze the local features of its surroundings using the Trace space constructed using Trace transform or Radon transform functions.

Figure 3:
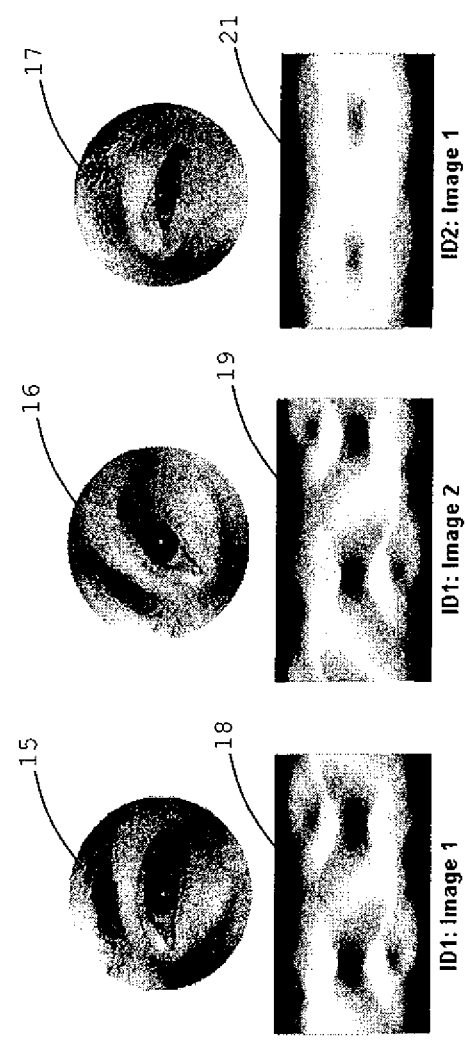
FIGS. 3a, 3b and 3c are diagrams of multilayer ocular recognition images and signature exhibiting extracted features from eye structure, skin texture and iris patterns.

Again, one may introduce a standoff ocular recognition technique to augment the current state of the art iris recognition technology. One may cast the ocular recognition challenge as one of classifying among two feature sets extracted from iris patterns and proximal and eye skin texture and eye appearance using trace space representation. FIGS. 1a and 1b appear to show irises 11 and 12 of two different eyes. Also shown are iris signatures 13 and 14 of irises 11 and 12, respectively, using Trace space. FIGS. 3a, 3b and 3c show multilayer ocular recognition using extracted features from the eye structure, skin texture and iris patterns.

A merit of the approach is that it may allow users to enroll or match poor quality iris images that would be rejected by current state of the art technology. In addition, this approach may generate a list of possible matches instead of only the best match when the iris-print is too obscured to be a reliable matcher.

Figure 2:
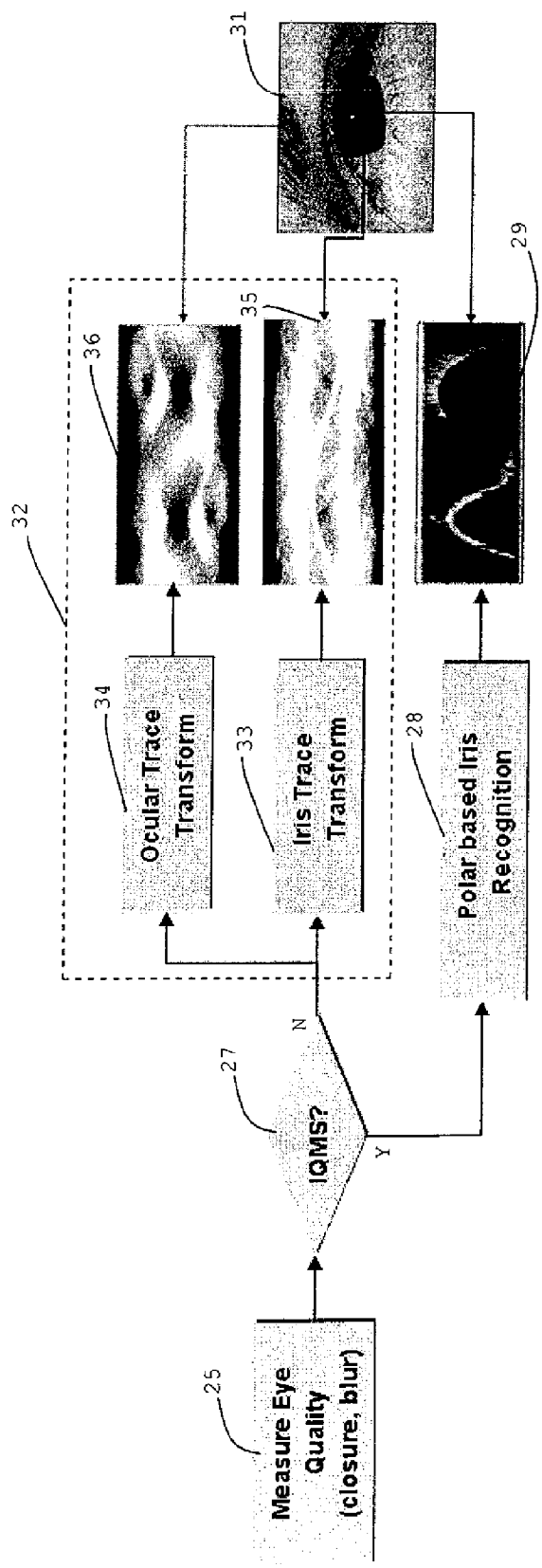
FIG. 2 is a diagram of an illustrative example of ocular system architecture.

The technical rationale and approach may be noted. One may introduce the ocular system that augments iris recognition with ocular features extracted from both the eye proximal skin and the holistic eye appearance. The system architecture of the overall system is presented in FIG. 2. This Figure shows an illustrative example of ocular system architecture. Eye image quality may be measured at symbol 25. The quality measured may be evaluated at symbol 26 for IQMS (image quality metrics) to determine whether the quality sufficient for an ordinary iris recognition approach such as a polar based iris recognition approach at symbol 28 which may provide an iris map 29 of the iris of an eye 31. If the quality of the image is not adequate for the recognition approach at symbol 28, it may be still be sufficient for the present adaptive iris matching approach in symbol 32. From eye image, an iris trace transform may be applied at symbol 33 to result in an iris signature 35. An ocular trace transform at symbol 34 may be performed to result in an ocular signature 36.

Various properties may be obtained from the eye image for recognition. Iris recognition—this is an iris recognition technique that may be processed using a POSE technique noted herein. Proximal skin texture and face appearance recognition—this process may extract features from the iris proximal skin texture by analyzing a holistic view of the eye appearance as well as the texture patterns of the skin around the eye and analyze the local features of its surroundings using Trace space. The eye trace signatures may be obtained by masking the iris and the white region of the eye from the holistic view of the eye. The masking may reduce side affects from iris movements in the scalar region.

One may measure the eye and iris quality metrics to derive the combination of the signatures from the extracted prints. Having a signature print per each module, rather then just the iris-print, may enable the system to reduce the scatter of features across eye signatures with less variability and boost the discriminating power among the prints of different subjects.

One may augment the iris recognition by extracting features from the holistic view of the eye appearance and the proximal skin textures of the eye. The holistic eye appearance that extends to the eyebrow and surrounding spatial features of the eye shape may provide additional insight on the identity of the person. One may introduce a new framework for interpreting eye image appearance and its surrounding skin texture using Trace representation that permits a direct optimization on this new domain, which is feasible and leads to an algorithm which is rapid, accurate and robust. The Trace representation may employ the structure domain derived from reliable features using the mathematical Trace transforms, formulated to reduce the within eye variance and thus provide features robust to factors of signal variability.

The Trace transform (e.g., A. Kadyrov, and M. Petrou, "The Trace Transform and its Applications," IEEE Trans. PAMI, 23(8), Pp. 811-828, 2001), a generalization of a Radon transform, may be used in image processing for recognizing objects under transformations, i.e., nonlinear or linear transforms. One of the key properties of the Trace transform is that it can be used to construct features invariant to these transformations. It can pick up shape as well as texture characteristics of the described object. To produce Trace transforms, one may compute a functional along tracing lines of a masked eye image. One may mask the eye image in order to select only the significant features of importance from the eye Trace transform. As one processes eyes, one may wish to recognize a framed circular eye shape to eliminate any extraneous information from the computation of the Trace transform. For this purpose, one may define a local coordinate system with its center at the proximal pupil center (there may be other considerations especially for gazed eyes to pick the center at the limbic middle point regardless of the pupil off-angle to reduce the side effect of heavy gazing). The tracing lines may then be defined in the minimum enclosing circular region defined by the eye mask. One may show the results of a typical trace transform of different eye images 15, 16 and 17 in FIGS. 3a, 3b and 3b, respectively. However, eye images 15 and 16 appear to be of the same eye but with different orientations relative to the image acquisition mechanism used to capture the images. These Figures show Trace representations 18, 19 and 21 of the ocular appearance for eye images 15, 16 and 17, respectively. Similar masking may be applied across the three images to reduce the iris variations. (The Radon function may be used for tracing.)

Figure 4:
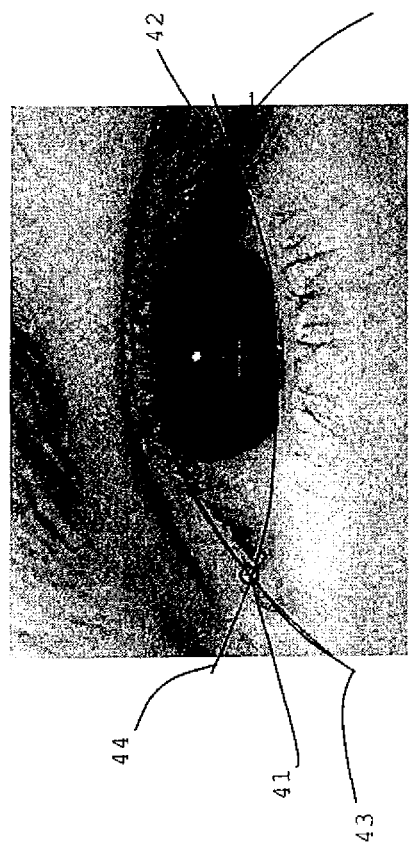
FIG. 4 is a diagram illustrating an example a normalization approach.

The present transformation is scale, translation, and rotation invariant, since prior to tracing the features, one may apply a normalization approach based on the intersection points 41 and 42, as shown in FIG. 4 that are highlighted with small circles on the left and right, of the two estimated upper and lower eyelid parabolas 43 and 44, respectively.

For normalization, one may use existing POSE library functionalities to extract the edge points of the upper and lower eyelids. The upper and lower edges may then be fit into two separate parabola models to delineate the lids limits. The intersections between these two curves may then be used as the reference points for normalizing different templates. The two intersection points may be used as a reference to normalize across different templates for scaling and translation calibrations. One may illustrate the process in FIG. 4. This Figure shows a basis for the normalization process.

In another approach, other Trace functions, besides Radon, which are well suited to model an eye appearance, may be utilized without violating the design being presented herein. By selecting the appropriate masking and formulating the most suitable Trace function, one may ensure that only genuine eye information is used in extracting the unique eye features. Different masking schemes may be applied to exclude sclera and pupil regions from the ocular appearance analysis to reduce the gazing side effect on the eye-print.

Given a probe of an eye-print, and the extracted trace model parameters (eye prints), the aim is to identify the individual in a way which is invariant to confounding factors as described above. If multiple trace representation eye-prints of the same individual exist in the queries, it may be possible to do this using the Mahalonobis distance measure, which may enhance the effect of inter-class variations whilst suppressing the effect of within class variation—expression, lighting, and pose. Let $\vec{P}=[p_1, \ldots, p_N]^T$ be the probability mass function generated by the probe p and $\vec{Q}_k=[q_1, \ldots, q_N]^T$ be the centroid of the multivariate distribution of class k, and C is the common within class covariance matrix for virtually all the training samples. The distance may be defined as $$d(p,q_k)=(\vec{p}-\vec{q}_k)^T C^{-1} (\vec{p}-\vec{q}_k).$$

For the present recognition approach, one may consider other similarity measures. One may examine the Jeffreys divergence (J-divergence or spectral information divergence) measure, $$d(p, q_k) = \int [p(x) - q_k(x)] \log\left(\frac{p(x)}{q_k(x)}\right) dx,$$

which attempts to quantify "approximate symmetry" and also aids to classify the eye-print as a bilaterally symmetrical/asymmetrical match to the query. This similarity measure may generate the most probable matches instead of only the best match.

A merit of this module is that it may allow users to enroll with or to identify poor quality eye images that would be rejected by other approaches. Another merit of this approach is that it may potentially improve ocular identification efficiency. One may make use of the eye-prints to rapidly index a subset of individuals before actually executing the iris recognition. This means that the matching speed may be much faster.

There may be great promise for iris technology with a false reject rate between 0.01-0.03 at a false acceptance rate of 10-3. The false non-matching rate (FNMR) versus false matching rate (FMR) may be better even on larger datasets. The uniqueness and richness of iris patterns even when deployed to large number of population may be a requirement that should be met to deploy the technology as a true biometric tool. These appear to be very encouraging results; however, virtually all reported iris recognition performance was conducted on mostly frontal iris databases. Limited research appeared to be devoted to address non-cooperative subjects. A few developed techniques may address the true nature of iris irregularity in iris segmentation (see e.g., U.S. patent application Ser. No. 11/043,366, filed Jan. 26, 2005). Apart from estimating these irregularities, the segmentation routine should also detect reflections due to ambient light sources and occlusions due to eyelashes and eyelids.

The present approach may address issues with iris segmentation and feature extraction of poorly captured or occluded iris images, obscuration, motion blur, and illumination artifacts in view of a foundation (i.e., U.S. patent application Ser. No. 11/043,366, filed Jan. 26, 2005), which appears designed for non-ideal iris images.

Work in texture recognition appears to be mostly for the purpose of facial feature tracking or for dermatology to develop an approach for computer assisted diagnosis of skin disorders. An approach in texture modeling may characterize an image texture with a feature distribution. Skin texture modeling may necessitate a model which should account for the appearance variations with the imaging conditions. A model may use a feature distribution which is a function of the imaging conditions. The modeling may be based on histograms of two sets of features: 1) Image texton—obtained by clustering the output of oriented multiscale filtering; and 2) Symbolic texture primitive—defined as a spatial configuration of indices of filter bank that has a large response relative to the other filters. The recognition approach may be based on a subspace technique using Eigenspace projection. The histograms from training images for texture classes may be used to create an Eigenspace, and then the primitive histograms from a certain class may be projected to points in the Eigenspace, which represent a sampling of the manifold of points for the pattern of the probe texture class. For recognition, the feature histograms from a query skin-print may be projected into the Eigenspace and compared with each point in the training set. The class of the nearest neighbor may appear as the classification result.

Various statistical techniques for face recognition may differ in the type of projection and distance measure used. The present Trace approach appears different from subspace techniques, e.g., work by Honeywell International Inc. on Kernel PCA or Eigen-eye (i.e., a modified version of Eigen-face using principal component analysis) or fisher-eye (similar to Fisher-face).

The present technical approach may be based on the exploitation of the multilayer representation of the iris and the periocular region to develop a true standoff ocular recognition system. The present approach may include at least two main processes, each producing a unique signature suitable for identification (an eye-print and iris-print). The present approach may use a holistic ocular appearance model that captures the shape of eyebrow and surrounding spatial features of the eye using Trace transforms. A suitable trace function may be considered to capture the shape variability present in the eye in addition to the ordinary iris signature to include the periocular skin region of the eye.

Figure 5:
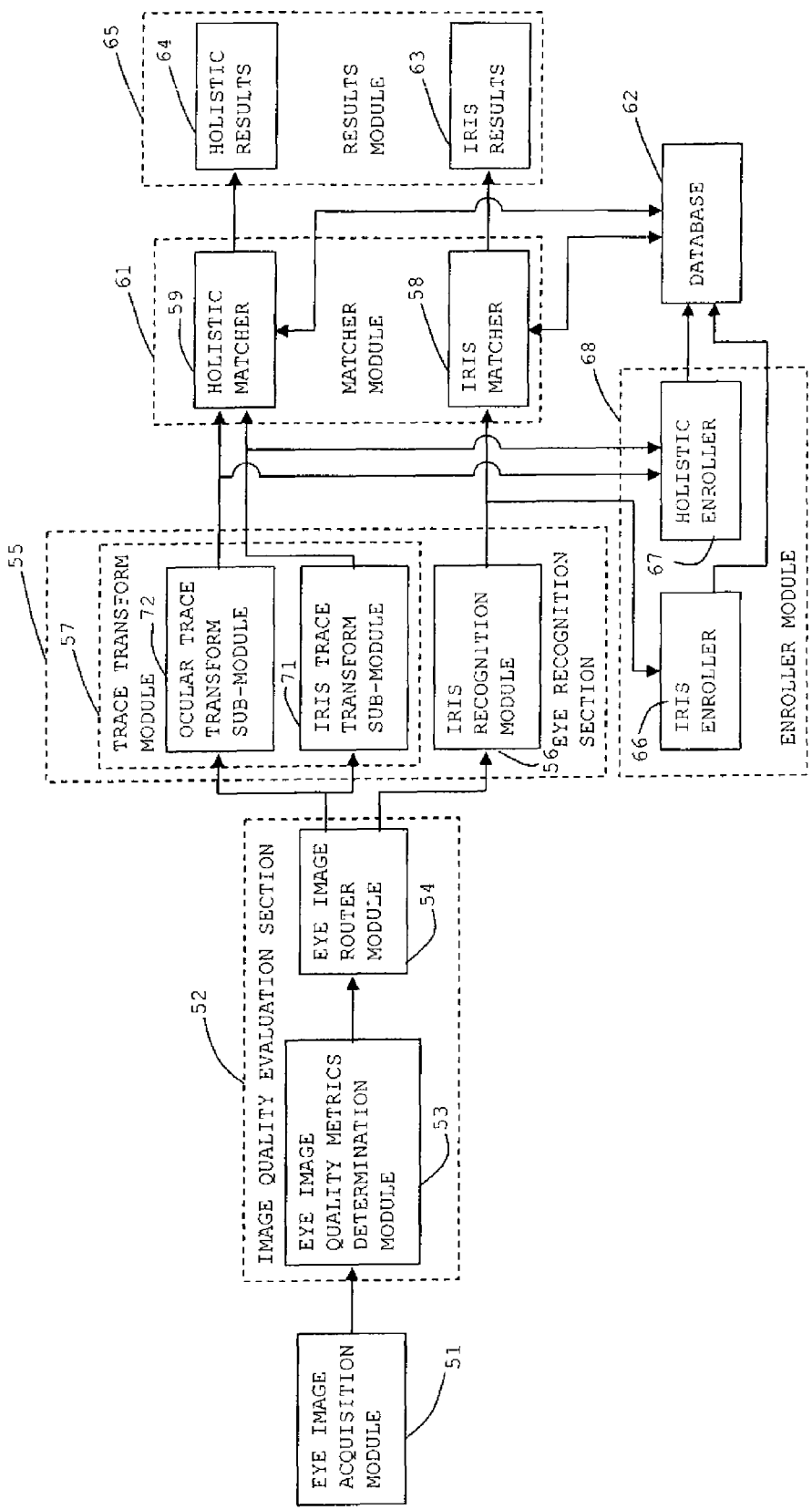
FIG. 5 is a diagram of an illustrative example of the present adaptive iris matching approach.

FIG. 5 is a diagram of an illustrative example of the present adaptive iris matching approach. An eye image acquisition module 51 may obtain an image of an eye. The image may proceed to an image quality evaluation section 52. In section 52 may be an eye image quality metrics determination module 53 which outputs an evaluation of the eye image. An eye image router may take the evaluation and determine to which module of an eye recognition section 55 that the eye image should be conveyed. If the quality of the image is rather high, then the image may go to an iris recognition module 56 for processing. If the quality of the image is not high or good enough for processing by module 56, then the image may go to a trace transform module 57 for processing. If the image is too poor in quality, such as being quite blurred, the image may be discarded and a new image may be captured. The router module 54 may determine the amount of quality that the image needs to have for the regular iris recognition module 56 and the trace transform module 57, and respectively forward the image to virtually all modules while prioritizing the outcome using the appropriate module (i.e., give more weight to the appropriate module based upon the quality of the image). There may be a rehabilitation module (not shown) for which the image may be sent for possible rehabilitation. If the image cannot be rehabilitated, then image may be rejected.

After the image is processed by the iris recognition module 56, the image may proceed on to an iris matcher 58. Matcher 58 may search a database 62 for a best matching iris relative to the iris of the processed image. The best matching iris, along with any available identity information of a person associated with the iris, may be sent to iris results 63 of results module 65. If there is no best matching iris or an adequate best matching iris found in database 62, then the iris of the processed image may be provided along with any identity information to an enroller 66 of an enroller module 68 to be entered in database 62. The matching process may be influenced using weighting the outcome of virtually all of the modules based upon the iris quality measure.

As noted, if the quality of the image does not necessarily reach a predefined quality measure for processing by module 56 and goes to trace transform module 57, the image may go to an iris trace transform sub-module 71 for transformation to an iris signature using trace space. The image may also go to an ocular trace transform sub-module 72 for transformation to an ocular signature using trace space. Module 71 or module 72 singularly, or modules 71 and 72 together, may be used in for trace transformation of the image. In either case, the signatures may be provided to a holistic matcher 59 of matcher module 61. Or the signatures from sub-modules 71 and 72 may be provided to separate matchers (not shown). Matcher 61 may search database 62 for the most probable matches of signatures instead of only the best match. The search may be based on a similarity measure or some other useful criterion. If the most probable matches show little promise or are sufficient for pre-designated purposes, the iris trace signature and/or the ocular trace signature may be enrolled separately or together with identity information by a holistic enroller 67 of enroller module 68, in database 62. Various configurations of the approach shown in FIG. 5 may be implemented.

Relevant applications may include U.S. patent application Ser. No. 11/675,424, filed Feb. 15, 2007, and entitled "Standoff Iris Recognition System"; U.S. patent application Ser. No. 11/372,854, filed Mar. 10, 2006, and entitled "Invariant Radial Iris Segmentation"; U.S. patent application Ser. No. 11/043,366, filed Jan. 26, 2005, and entitled "Iris Recognition System and Method"; U.S. patent application Ser. No. 11/672,108, filed Feb. 7, 2007, and entitled "Approaches and Apparatus for Eye Detection in a Digital Image"; U.S. patent application Ser. No. 11/681,614, filed Mar. 2, 2007, and entitled "Iris Recognition System Having Image Quality Metrics"; U.S. patent application Ser. No. 11/681,751, filed Mar. 2, 2007, and entitled "Indexing and Database Search System"; U.S. patent application Ser. No. 11/681,662, filed Mar. 2, 2007, and entitled "Expedient Encoding System; U.S. patent application Ser. No. 10/979,129, filed Nov. 3, 2004, entitled "System and Method for Gate Access Control"; U.S. patent application Ser. No. 10/655,124, filed Sep. 5, 2003, and entitled "System and Method for Dynamic Stand-Off Biometric Verification" (issued as U.S. Pat. No. 7,183,895); and U.S. Provisional Patent Application 60/778,770, filed Mar. 3, 2006, and entitled "Stand-Off Iris Detection Tracking and Recognition System"; all of which are hereby incorporated by reference.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A standoff ocular recognition system comprising:
   an eye image acquisition module;
   an image quality evaluation section connected to the eye image acquisition module;
   an eye recognition section connected to the image quality evaluation section; and
   a matcher module connected to the eye recognition section; and
   wherein the eye recognition section comprises a trace transform module for converting eye images into trace space; and
   wherein the image quality evaluation section is configured to determine if an eye image meets a threshold of quality metrics and eye images deemed not to meet the threshold of quality metrics are converted into trace space and eye images deemed to meet the threshold of quality metrics bypass the trace transform module.

2. The system of claim 1, wherein the eye recognition section further comprises an iris recognition module.

3. The system of claim 2, wherein the image quality evaluation section comprises:
   an eye image quality metrics determination module connected to the eye image acquisition module; and
   an eye image router module connected to the eye image quality metrics determination module and the eye recognition section.

4. The system of claim 3, wherein:
   the eye image router module provides eye images, deemed not to meet the threshold of quality metrics according to the eye image quality metrics determination module, primarily to the trace transform module;
   the eye image router module provides eye images, deemed to meet the threshold of quality metrics according to the eye image quality metrics determination module, primarily to the iris recognition module; and
   the eye image router module can provide eye images approximately simultaneously to the trace transform module and the iris recognition module, with an outcome weighed based on iris quality.

5. The system of claim 2, wherein the iris recognition module comprises a polar segmentation approach for extracting a map of an iris from an eye image provided from the image quality evaluation section.

6. The system of claim 2, wherein the iris recognition module is connected to an enroller module for enrolling maps of the irises and identities of individuals associated with the maps of irises, in a database.

7. The system of claim 1, wherein the trace transform module comprises:
   an ocular trace transform sub-module connected to the image quality evaluation section; and
   an iris trace transform sub-module connected to the image quality evaluation section.

8. The system of claim 7, further comprising a results module connected to the matcher module.

9. The system of claim 8, wherein the matcher module comprises:
- a holistic eye matcher connected to the ocular recognition module; and
- an iris matcher connected to the iris trace transform sub-module.

10. The system of claim 9, wherein the results module comprises:
- a holistic eye results sub-module connected to the holistic eye matcher; and
- an iris results sub-module connected to the iris matcher.

11. The system of claim 10, wherein:
- the holistic eye matcher is connected to a database of trace model parameters associated with individuals; and
- the iris matcher is connected to a database of iris maps associated with individuals.

12. The system of claim 11, wherein:
- the holistic eye matcher provides to the holistic results sub-module most probable matches rather than an only best match; and
- the most probable matches are determined according to a similarity measure between the trace model parameters of eye images provided to the ocular trace transform sub-module and trace model parameters in the database of trace model parameters associated with individuals.

13. The system of claim 12, wherein the iris matcher provides an only best match.

14. The system of claim 7, wherein:
- the ocular trace transform sub-module comprises information about features of a structure of the eye and skin texture proximate to the eye; and
- the iris trace transform sub-module comprises information about a pattern of the iris.

15. The system of claim 7, wherein:
- the ocular trace transform sub-module is connected to an enroller module for enrolling trace transforms of ocular images and identities of individuals associated with the trace transforms, in a database; and
- the iris trace transform sub-module is connected to an enroller module for enrolling trace transforms of iris images and identities of individuals associated with the trace transforms, in a database.

16. The system of claim 1, wherein in the trace transform module, prior to a trace transformation, a normalization based on intersection points of two estimated eyelid parabolas, one parabola being fit to an edge of an upper eyelid and another parabola being fit to an edge of a lower lid, has the intersection points as reference points for the normalization of various templates.

17. A method for ocular recognition, comprising:
- acquiring an eye image;
- evaluating the eye image relative to quality;
- routing eye images having good quality to an iris recognition module;
- routing eye images having poor quality to a trace transform module;
- converting eye images having poor quality to trace transforms;
- matching ocular trace transforms with ocular trace transforms, associated with identities of individuals, in a database; and wherein:
- an eye image has poor quality if the eye image is evaluated not to meet a predefined threshold of quality metrics; and
- the matching ocular trace transforms of eye images is based on a similarity measure relative to the ocular trace transforms in the database.

18. The method of claim 17, wherein the matching based on the similarity measure generates a group of most probable matches instead of one best match.

19. The method of claim 17, further comprising:
- processing eye images having good quality into iris images for iris recognition; and
- matching the iris images with iris images, associated with identities of individuals, in a database; and wherein:
- an image has good quality if the eye image is evaluated to meet a predefined threshold of quality metrics; and
- a matching of iris images generates a one best match.

20. A method for standoff ocular recognition, comprising:
- acquiring an eye image;
- determining quality metrics of the eye image;
- processing eye images having good quality into iris images for iris recognition:,
- performing trace transformation of an eye image, having quality metrics below a certain threshold, into ocular signature images; and
- a matching of the ocular signature images with ocular signature images associated with identities of individuals in a database, which generates a number of most probable matches; and wherein an eye image having a quality below a certain threshold is deemed to provide an iris print too obscured to be a reliable matcher for selecting one best match among iris prints in the database.

* * * * *